J. A. SEEDE.
ARC WELDING SYSTEM.
APPLICATION FILED JAN. 31, 1914.

1,141,980.

Patented June 8, 1915.

WITNESSES:
Anthony Marr.
J. Elli Glen.

INVENTOR:
JOHN A. SEEDE,
BY
HIS ATTORNEY

UNITED STATES PATENT OFFICE.

JOHN A. SEEDE, OF NISKAYUNA, NEW YORK, ASSIGNOR TO GENERAL ELECTRIC COMPANY, A CORPORATION OF NEW YORK.

ARC-WELDING SYSTEM.

1,141,980.   Specification of Letters Patent.   Patented June 8, 1915.

Application filed January 31, 1914. Serial No. 815,822.

*To all whom it may concern:*

Be it known that I, JOHN A. SEEDE, a citizen of the United States, residing at Niskayuna, county of Schenectady, State of New York, have invented certain new and useful Improvements in Arc-Welding Systems, of which the following is a specification.

My invention relates to electric arc welding and the objects of my invention are to provide for a striking voltage of the arc, not greater than, but otherwise substantially independent of the no load voltage of the source and to provide for the proper striking voltage without an undue expenditure of energy during the interruptions of the welding operation. I propose to carry out these objects by means of a resistance additional to the usual regulating resistance, connecting this additional resistance across the source of energy and connecting the work across a variable section of it. The voltage difference between the electrode and the work during interruptions of the arc is therefore determined principally by the extent of the section of the resistance spanned by the connections to the electrode and work, for inasmuch as the same current flows throughout the whole resistance there is a uniform drop in potential along its length, and the difference of potential between the electrode and the work is the difference in potential of the two points on the resistance to which the connections are made. To maintain these potentials during the interruptions of the arc by my invention, it is unnecessary for the current to be equal to the working current; it may have a value but a small fraction of the working current, requiring the expenditure of a minimum amount of energy during the interruptions of the arc. The potentials between the electrode and work may be made adjustable by arranging for the ready transfer of the connections between different points on the resistance. I prefer in addition to provide means for transferring the connections to the electrode and the work to the extremities of the additional resistance after the arc is struck. This allows the control of the voltage from this stage to be taken up in any desired way with no unnecessary loss of energy.

In the accompanying drawing I have illustrated diagrammatically two welding systems involving my invention.

Figure 1:
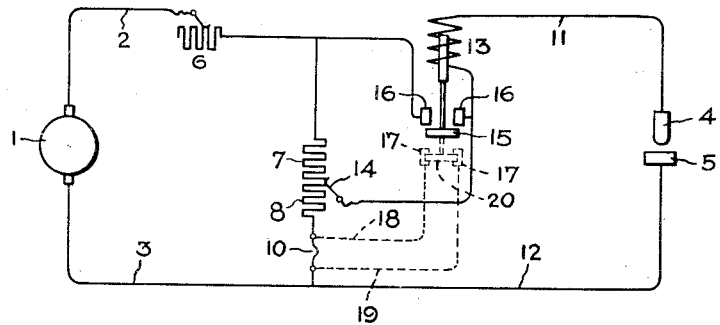
Figure 2:
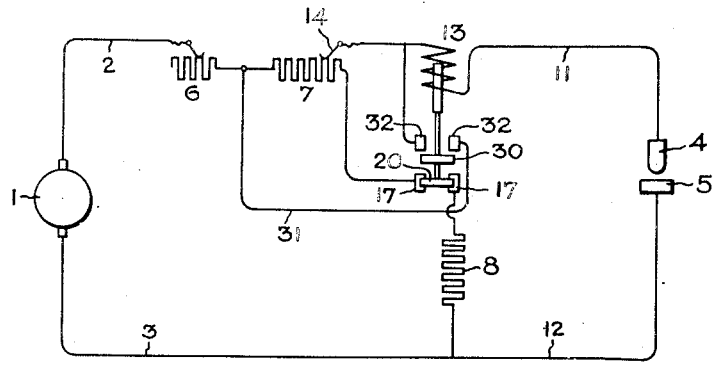

Figure 1 diagrammatically illustrates a system by means of which my invention may be readily understood. Fig. 2 illustrates a modified system which in some ways is better adapted to actual service.

Referring first to Fig. 1: A direct current generator 1 is the source of energy supplying current through the connections 2 and 3 to the electrode 4 and work 5. In these connections is the usual adjustable regulating resistance 6. The additional resistance 7, 8 is connected between the connections 2 and 3 through the conductor 10. The electrode 4 and work 5 are connected across a portion 8 of the resistance 7, 8 by means of the connections 11 and 12, the connection 11 including the winding of a series relay 13 and an adjustable contact 14 which may contact with the resistance 7, 8 at any one of a plurality of points along its length. The solenoid of the relay 13 carries the bridging contact 15 which in its upper or actuated position is adapted to bridge the contacts 16, thus connecting the electrode 4 directly to the source of energy through only the regulating resistance 6; the work 5 is preferably permanently connected to one extremity of the resistance 7, 8 thus making it necessary to transfer but one connection when the operation is begun. The relay 13 may have a more or less sluggish action to allow the operator to draw the arc before the contacts 16 are engaged. The portions of the system shown in dotted lines will be described later.

The operation of the system so far described is as follows: The resistance 6 is adjusted to allow the desired current to flow to the work during the welding operation. During an interruption of the arc, current flows from the source 1 through resistances 6 and 7, 8, and the conductors 10 and 3 back to the source. The value of this current is determined by the value of the resistances in series; in general the value of the additional resistance is limited only by the fact that the part 7 of it must allow sufficient current to pass to allow the drawing of the arc. The value of the difference of potential between the electrode and the work at this time is determined by the position of the contact 14 on the resistance 7, 8. When the contact 14 is adjusted to the proper position, the arc is struck between 4 and 5 and the passage of the current through the solenoid of the relay 13 causes the relay to attract its armature, completing the circuit through the contacts 16. Energy is then supplied to the work from the source through the regulating resistance 6, the contacts 16, the connection 11 and through the electrode 4 and work 5 directly back to the source. When the arc is broken the relay returns to the position illustrated.

With the system as above described, some current flows constantly through the resistance 7, 8, even during the continuance of the welding operation. This is lost energy and affects the regulation of the resistance 6 by increasing the voltage drop therein over that produced by the current through the arc. While this loss of energy may in some cases be worth while in order to assure a constant load on the source, still the advantage of saving energy in other cases may be superior. This loss may be prevented by omitting the conductor 10, and adding the stationary contacts 17 attached to the conductors 18 and 19 and the bridging contact 20 on the relay armature, all as shown in dotted lines; the contacts 17 are adapted to be bridged by the contact 20 of the relay 13 when the armature of the relay is in its lower position, as illustrated, and the contact 20 leaves the contacts 17 as the armature moves up, only after the contact 15 has bridged the contacts 16 as will be seen from the relative locations of all the contacts. This action is desirable in order to assure the continuance of the arc as the connections are changed. The operation of this system is substantially like that previously described, with the exception that when the armature of relay 13 is attracted the circuit through the resistance 7, 8 is opened at 17, 17.

Referring to Fig. 2: The additional resistance is here shown divided into two distinct physical portions 7 and 8. These two portions are connected in series through the contacts 17 and 20 across the generator 1. The connection 11 of the electrode is made to a contact finger 14 which can vary the amount of the resistance 7 in series between the generator 1 and the electrode 4 in any desired manner. The connection 11 as before contains the solenoid of a series relay 13 which controls the bridging contacts 30 and 20. Another connection 31 containing the contacts 32 adapted to be bridged by the contact 30, is arranged to short-circuit the resistance portion 7 whenever the core of the relay 13 is attracted and the bridging contacts raised thereby; it will be observed that only after the bridging contact 30 bridges the contacts 32, does the contact 20 leave the contacts 17, breaking the connection through the resistances 7 and 8. The operation of this system is substantially like that last described above.

Various other modifications may be made within the spirit of my invention and I contemplate including such modifications within the terms of the following claims.

What I claim as new and desire to secure by Letters Patent of the United States, is:—

1. In an arc welding system a source of energy, resistance means connected across said source, connections for connecting the work across a portion of said resistance means, and means operable when energy is supplied to the work for removing from the welding circuit that portion of the resistance means therein.

2. In an arc welding system a source of energy, resistance means connected across said source, connections for connecting the work across an adjustable portion of said resistance means, and means operable when energy is supplied to the work for removing from the welding circuit that portion of the resistance means therein.

3. In an arc welding system a source of energy, resistance means connected across said source, connections for connecting the work across a portion of said resistance means and means for transferring one of said connections from an intermediate point to an extremity of said resistance means when energy is supplied to the work.

4. In an arc welding system, a source of energy, resistance means connected across said source, connections for connecting the work across a portion of said resistance means and means for transferring one of said connections from an intermediate point to an extremity of said resistance and for opening the circuit through the resistance means.

5. In an arc welding system, a source of energy, resistance means connected across said source, connections for connecting the work across an adjustable portion of said resistance means and means for transferring one of said connections from an intermediate point to an extremity of said resistance means when energy is supplied to the work.

6. In an arc welding system a source of energy, resistance means connected across said source, connections for connecting the work across an adjustable portion of said resistance means and means for transferring one of said connections from an intermediate point to an extremity of said resistance and for opening the circuit through the resistance means when energy is supplied to the work.

In witness whereof, I have hereunto set my hand this 30th day of January, 1914.

JOHN A. SEEDE.

Witnesses:
BENJAMIN B. HULL,
HELEN ORFORD.